US012412509B2

(12) United States Patent
Kwon et al.

(10) Patent No.: US 12,412,509 B2
(45) Date of Patent: Sep. 9, 2025

(54) PIXEL CIRCUIT AND DISPLAY DEVICE HAVING THE SAME

(71) Applicant: SAMSUNG DISPLAY CO., LTD., Yongin-si (KR)

(72) Inventors: Semyung Kwon, Yongin-si (KR); Injun Bae, Yongin-si (KR); Sugwoo Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/325,430

(22) Filed: May 30, 2023

(65) Prior Publication Data

US 2024/0054943 A1 Feb. 15, 2024

(30) Foreign Application Priority Data

Aug. 9, 2022 (KR) ........................ 10-2022-0099299

(51) Int. Cl.
*G09G 3/32* (2016.01)

(52) U.S. Cl.
CPC ......... *G09G 3/32* (2013.01); *G09G 2300/043* (2013.01); *G09G 2300/0842* (2013.01); *G09G 2310/0275* (2013.01); *G09G 2320/0257* (2013.01)

(58) Field of Classification Search
CPC ............... G09G 3/32; G09G 2300/043; G09G 2310/0275; G09G 2320/0257; G09G 3/3233; G09G 2300/0819; G09G 2300/0861; G09G 2300/0842; G09G 2310/08; G09G 3/3266; G09G 2300/0426; G09G 2320/0233; G09G 2300/0852; G09G 2330/021; G09G 3/3225; G09G 2320/045; G09G 2310/0262; G09G 2310/0251;
(Continued)

(56) References Cited

U.S. PATENT DOCUMENTS

| | | | | |
|---|---|---|---|---|
| 10,319,278 | B1 * | 6/2019 | Nho | G09G 3/2003 |
| 2019/0057646 | A1 * | 2/2019 | Lin | G09G 3/3233 |
| 2020/0035164 | A1 * | 1/2020 | Qing | G09G 3/3266 |

(Continued)

FOREIGN PATENT DOCUMENTS

| | | |
|---|---|---|
| KR | 10-2015-0144882 | 12/2015 |
| KR | 10-2021-0114578 | 9/2021 |
| KR | 10-2021-0137328 | 11/2021 |

*Primary Examiner* — Sujit Shah

(74) *Attorney, Agent, or Firm* — F. CHAU & ASSOCIATES, LLC

(57) ABSTRACT

A pixel circuit includes a light emitting element, a write transistor configured to write a data voltage in response to a write gate signal, a driving transistor configured to generate a driving current based on the data voltage and to apply the driving current to the light emitting element, a compensation transistor configured to diode-connect the driving transistor in response to a compensation gate signal, a first initialization transistor configured to apply a first initialization voltage to a control electrode of the driving transistor in response to an initialization gate signal, and a second initialization transistor configured to apply a second initialization voltage to an anode electrode of the light emitting element in response to a bias gate signal having an activation period longer than at least one of the compensation gate signal and the initialization gate signal.

20 Claims, 13 Drawing Sheets

(58) Field of Classification Search
CPC ......... G09G 2320/0238; G09G 3/3258; G09G 2310/061; G09G 3/3648
See application file for complete search history.

(56) References Cited

U.S. PATENT DOCUMENTS

| | | | | |
|---|---|---|---|---|
| 2021/0057502 | A1* | 2/2021 | Kim | H01L 27/1251 |
| 2021/0183303 | A1* | 6/2021 | Kim | G09G 3/32 |
| 2021/0257430 | A1 | 8/2021 | Jeong et al. | |
| 2021/0366398 | A1* | 11/2021 | Choi | G09G 3/3233 |
| 2021/0383743 | A1* | 12/2021 | Yuan | G09G 3/32 |
| 2021/0407419 | A1* | 12/2021 | Li | G09G 3/3258 |

* cited by examiner

PIXEL CIRCUIT AND DISPLAY DEVICE HAVING THE SAME

CROSS-REFERENCE TO RELATED APPLICATIONS

This application claims priority under 35 U.S.C. § 119 to Korean Patent Application No. 10-2022-0099299, filed on Aug. 9, 2022 in the Korean Intellectual Property Office, the disclosure of which is incorporated by reference herein in its entirety.

TECHNICAL FIELD

Embodiments of the present inventive concept relate to a pixel circuit and a display device having the pixel circuit. More particularly, embodiments of the present inventive concept relate to a pixel circuit that receives a bias gate signal and a display device having the pixel circuit.

DISCUSSION OF RELATED ART

Generally, a display device may include a display panel, a timing controller, a gate driver, and a data driver. The display panel may include a plurality of gate lines, a plurality of data lines, and a plurality of pixel circuits electrically connected to the gate lines and the data lines. The gate driver may provide gate signals to the gate lines. The data driver may provide data voltages to the data lines. The timing controller may control the gate driver and the data driver.

Each of the pixel circuits may include a light emitting element that receives a driving current and emits light. The driving current may charge a capacitor connected to an anode electrode of the light emitting element (or an internal capacitor of the light emitting element), and the light emitting element may emit light with a luminance corresponding to the charged voltage.

SUMMARY

Embodiments of the present inventive concept provide a pixel circuit that initializes an anode electrode of a light emitting element.

Embodiments of the present inventive concept also provide a display device having the pixel circuit.

According to embodiments of the present inventive concept, a pixel circuit includes a light emitting element, a write transistor configured to write a data voltage in response to a write gate signal, a driving transistor configured to generate a driving current based on the data voltage and to apply the driving current to the light emitting element, a compensation transistor configured to diode-connect the driving transistor in response to a compensation gate signal, a first initialization transistor configured to apply a first initialization voltage to a control electrode of the driving transistor in response to an initialization gate signal, and a second initialization transistor configured to apply a second initialization voltage to an anode electrode of the light emitting element in response to a bias gate signal having an activation period longer than at least one of the compensation gate signal and the initialization gate signal.

In an embodiment, the activation period of the bias gate signal is greater than or equal to about 480 microseconds.

In an embodiment, the pixel circuit further includes a first emission transistor configured to apply a first power voltage to the driving transistor in response to an emission signal, and a second emission transistor configured to transmit the driving current to the light emitting element in response to the emission signal.

In an embodiment, the bias gate signal has the activation period in an inactivation period of the emission signal.

In an embodiment, the bias gate signal has an activation period after about 2 microseconds or more passes from when the emission signal is inactivated.

In an embodiment, the emission signal is generated based on an emission clock signal, and the emission signal has an activation period of N clock times of the emission clock signal, where N is a positive integer greater than 2.

In an embodiment, the activation period of the bias gate signal is shorter than the N clock times of the emission clock signal.

In an embodiment, the initialization gate signal, the compensation gate signal, and the write gate signal have an activation period in the activation period of the bias gate signal.

In an embodiment, the initialization gate signal has an activation period in the activation period of the bias gate signal, the write gate signal has an activation period in an inactivation period of the bias gate signal, and the compensation gate signal is activated in the activation period of the bias gate signal and is inactivated in the inactivation period of the bias gate signal.

In an embodiment, the initialization gate signal and the compensation gate signal are activated in an inactivation period of the bias gate signal, are inactivated in the activation period of the bias gate signal, and the write gate signal has an activation period in the activation period of the bias gate signal.

According to embodiments of the present inventive concept, a display device includes a display panel including a plurality of pixel circuits, a data driver configured to provide a data voltage to each of the pixel circuits, a gate driver configured to provide a write gate signal, a compensation gate signal, an initialization gate signal, and a bias gate signal to each of the pixel circuits, and a timing controller configured to control the data driver and the gate driver. Each of the pixel circuits includes a light emitting element, a write transistor configured to write the data voltage in response to the write gate signal, a driving transistor configured to generate a driving current based on the data voltage and to apply the driving current to the light emitting element, a compensation transistor configured to diode-connect the driving transistor in response to the compensation gate signal, a first initialization transistor configured to apply a first initialization voltage to a control electrode of the driving transistor in response to the initialization gate signal, and a second initialization transistor configured to apply a second initialization voltage to an anode electrode of the light emitting element in response to the bias gate signal having an activation period longer than at least one of the compensation gate signal and the initialization gate signal.

In an embodiment, the activation period of the bias gate signal is greater than or equal to about 480 microseconds.

In an embodiment, the display device further includes an emission driver configured to provide an emission signal to each of the pixel circuits. Each of the pixel circuits further includes a first emission transistor configured to apply a first power voltage to the driving transistor in response to the emission signal, and a second emission transistor configured to transmit the driving current to the light emitting element in response to the emission signal.

In an embodiment, the bias gate signal has an activation period in an inactivation period of the emission signal.

In an embodiment, the bias gate signal has an activation period after about 2 microseconds or more passes from when the emission signal is inactivated.

In an embodiment, the emission signal is generated based on an emission clock signal, and the emission signal has an activation period of N clock times of the emission clock signal, where N is a positive integer greater than 2.

In an embodiment, the activation period of the bias gate signal is shorter than the N clock times of the emission clock signal.

In an embodiment, the initialization gate signal, the compensation gate signal, and the write gate signal have an activation period in the activation period of the bias gate signal.

In an embodiment, the initialization gate signal has an activation period in the activation period of the bias gate signal, the write gate signal has an activation period in an inactivation period of the bias gate signal, and the compensation gate signal is activated in the activation period of the bias gate signal and is inactivated in the inactivation period of the bias gate signal.

In an embodiment, the initialization gate signal and the compensation gate signal are activated in an inactivation period of the bias gate signal, are inactivated in the activation period of the bias gate signal, and the write gate signal has an activation period in the activation period of the bias gate signal.

Therefore, according to embodiments of the present inventive concept, the display device may initialize an anode of a light emitting element for a longer period by including the light emitting element, a write transistor configured to write a data voltage in response to a write gate signal, a driving transistor configured to generate a driving current based on the data voltage and to apply the driving current to the light emitting element, a compensation transistor configured to diode-connect the driving transistor in response to a compensation gate signal, a first initialization transistor configured to apply a first initialization voltage to a control electrode of the driving transistor in response to an initialization gate signal, and a second initialization transistor configured to apply a second initialization voltage to an anode electrode of the light emitting element in response to a bias gate signal having an activation period longer than at least one of the compensation gate signal and the initialization gate signal.

In addition, according to embodiments of the present inventive concept, the display device may reduce an afterimage by including a pixel circuit that initializes an anode of a light emitting element for a longer period.

It is to be understood that the effects of embodiments of the present inventive concept are not limited to the above-described effects, and may be variously expanded without departing from the spirit and scope of the present inventive concept.

BRIEF DESCRIPTION OF THE DRAWINGS

The above and other features of the inventive concept will become more apparent by describing in detail embodiments thereof with reference to the accompanying drawings.

DETAILED DESCRIPTION OF THE INVENTIVE CONCEPT

Figure 1:
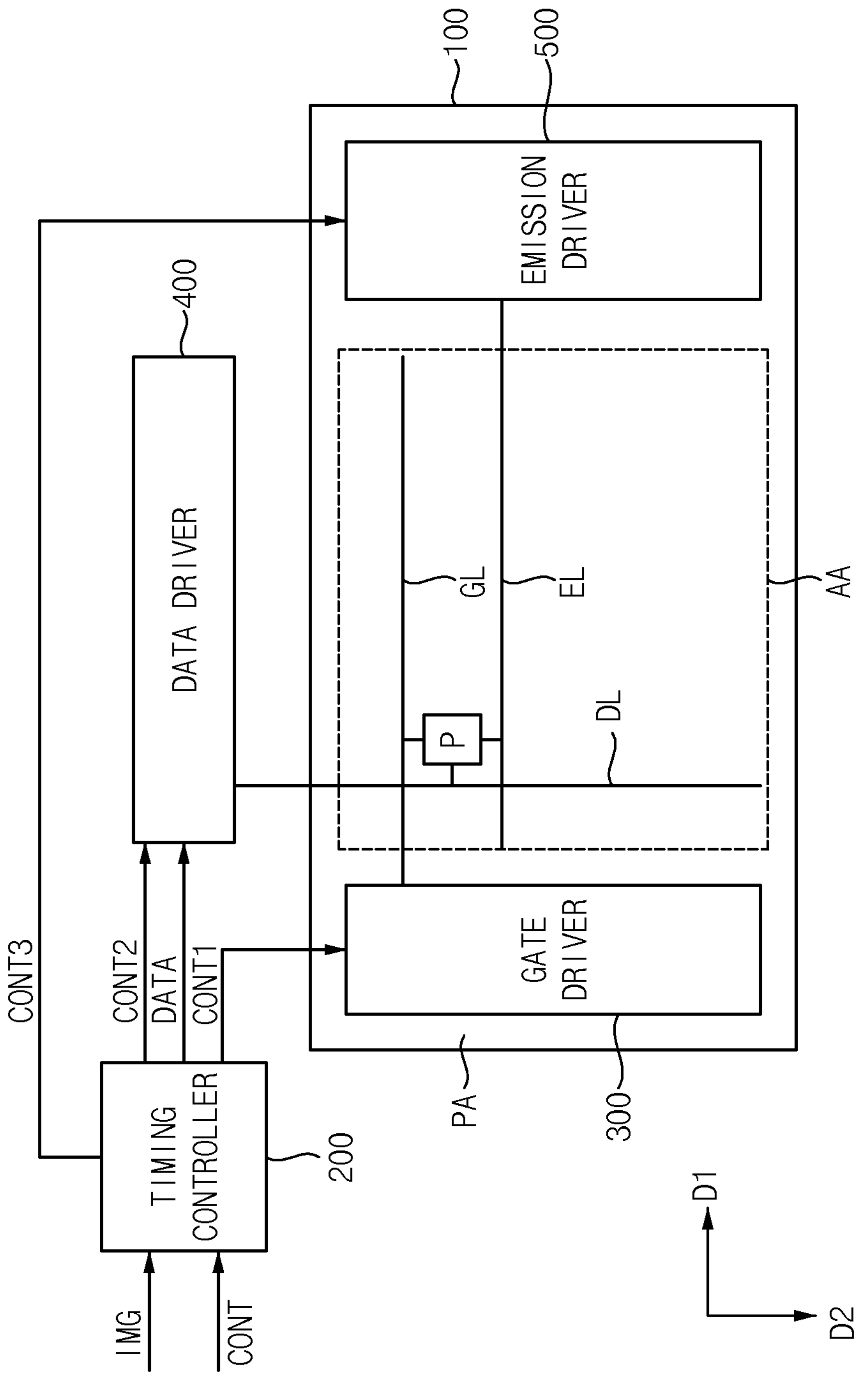
FIG. 1 is a block diagram illustrating a display device according to embodiments of the present inventive concept.

Embodiments of the present inventive concept will be described more fully hereinafter with reference to the accompanying drawings. Like reference numerals may refer to like elements throughout the accompanying drawings.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to exemplary embodiments, the parameter may be exactly the certain value or approximately the certain value within a measurement error as would be understood by a person having ordinary skill in the art.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

The terms of a singular form may include plural forms unless the context clearly indicates otherwise.

FIG. 1 is a block diagram illustrating a display device according to embodiments of the present inventive concept.

Referring to FIG. 1, the display device may include a display panel 100, a timing controller 200, a gate driver 300, a data driver 400, and a emission driver 500. In an embodiment, the timing controller 200 and the data driver 400 may be integrated into one chip.

The display panel 100 has a display region AA in which an image is displayed and a peripheral region PA adjacent to the display region AA. In an embodiment, the gate driver 300 and the emission driver 500 may be mounted in the peripheral region PA of the display panel 100.

The display panel 100 may include a plurality of gate lines GL, a plurality of data lines DL, a plurality of emission lines EL, and a plurality of pixel circuits P electrically connected to the data lines DL, the gate lines GL, and the emission lines EL. The gate lines GL and the emission lines EL may extend in a first direction D1 and the data lines DL may extend in a second direction D2 crossing the first direction D1.

The timing controller 200 may receive input image data IMG and an input control signal CONT from a host processor (e.g., a graphic processing unit GPU). For example, the input image data IMG may include red image data, green image data and blue image data. In an embodiment, the input image data IMG may further include white image data. In an embodiment, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, a third control signal CONT3, and data signal DATA based on the input image data IMG and the input control signal CONT.

The timing controller 200 may generate the first control signal CONT1 for controlling operation of the gate driver 300 based on the input control signal CONT, and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT, and output the second control signal CONT2 to the data driver 400. The second control signal CONT2 may include a horizontal start signal and a load signal.

The timing controller 200 may generate the third control signal CONT3 for controlling operation of the emission driver 500 based on the input control signal CONT, and output the third control signal CONT3 to the emission driver 500. The third control signal CONT3 may include a vertical start signal and a emission clock signal.

The timing controller 200 may receive the input image data IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltages to the data lines DL.

The emission driver 500 may generate gate signals for driving the emission lines EL in response to the third control signal CONT3 input from the timing controller 200. The emission driver 500 may output the emission signals to the emission lines EL. For example, the emission driver 500 may sequentially output the emission signals to the emission lines EL.

Figure 2:
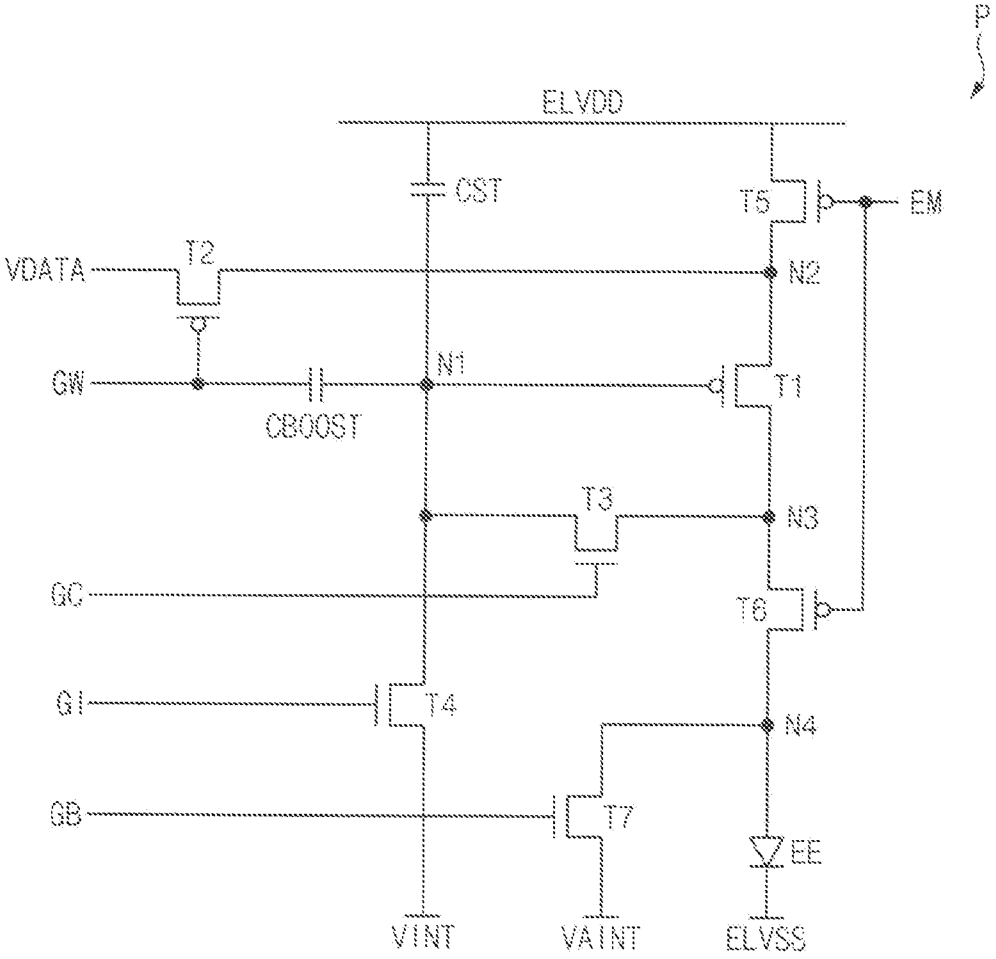
FIG. 2 is a circuit diagram illustrating an example of pixel circuits of the display device of FIG. 1 according to embodiments of the present inventive concept.
Figure 3:
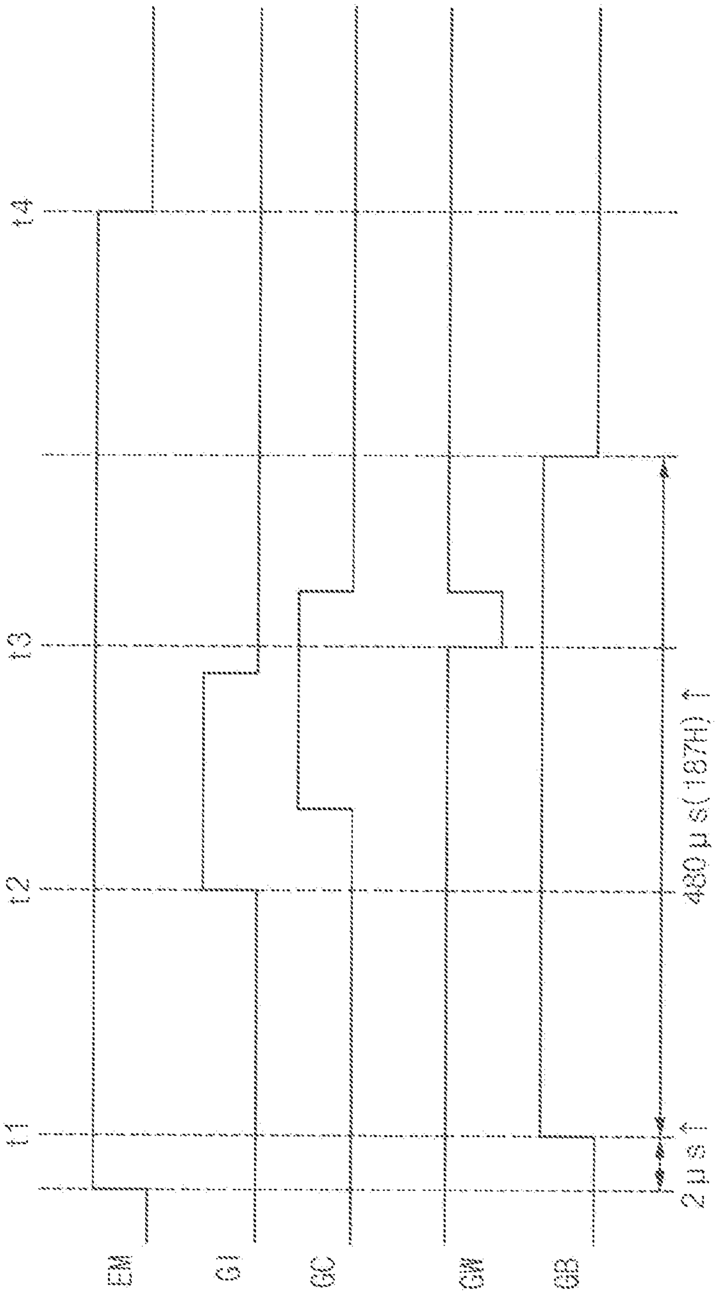
FIG. 3 is a timing diagram illustrating an example in which the display device of FIG. 1 drives a pixel circuit according to embodiments of the present inventive concept.
Figure 4:
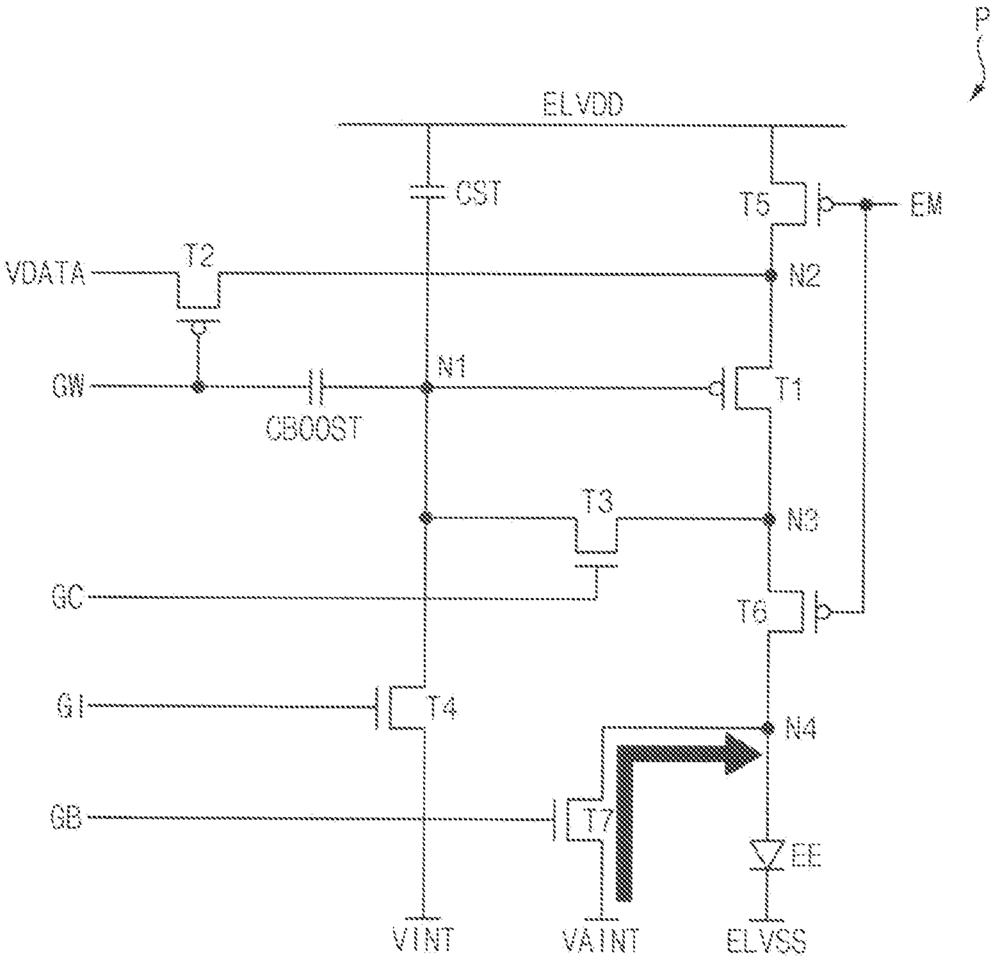
FIG. 4 is a circuit diagram illustrating an example in which the display device of FIG. 1 operates at a first time point according to embodiments of the present inventive concept.
Figure 5:
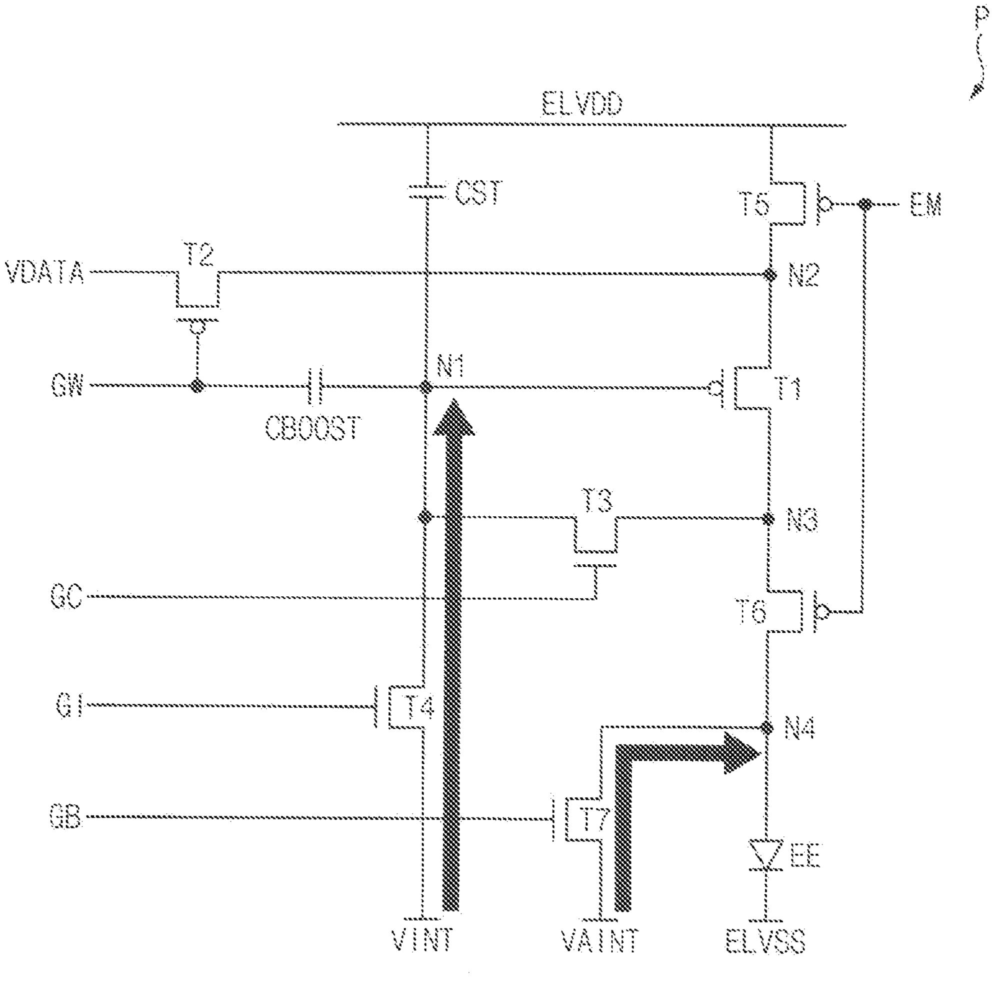
FIG. 5 is a circuit diagram illustrating an example in which the display device of FIG. 1 operates at a second time point according to embodiments of the present inventive concept.
Figure 6:
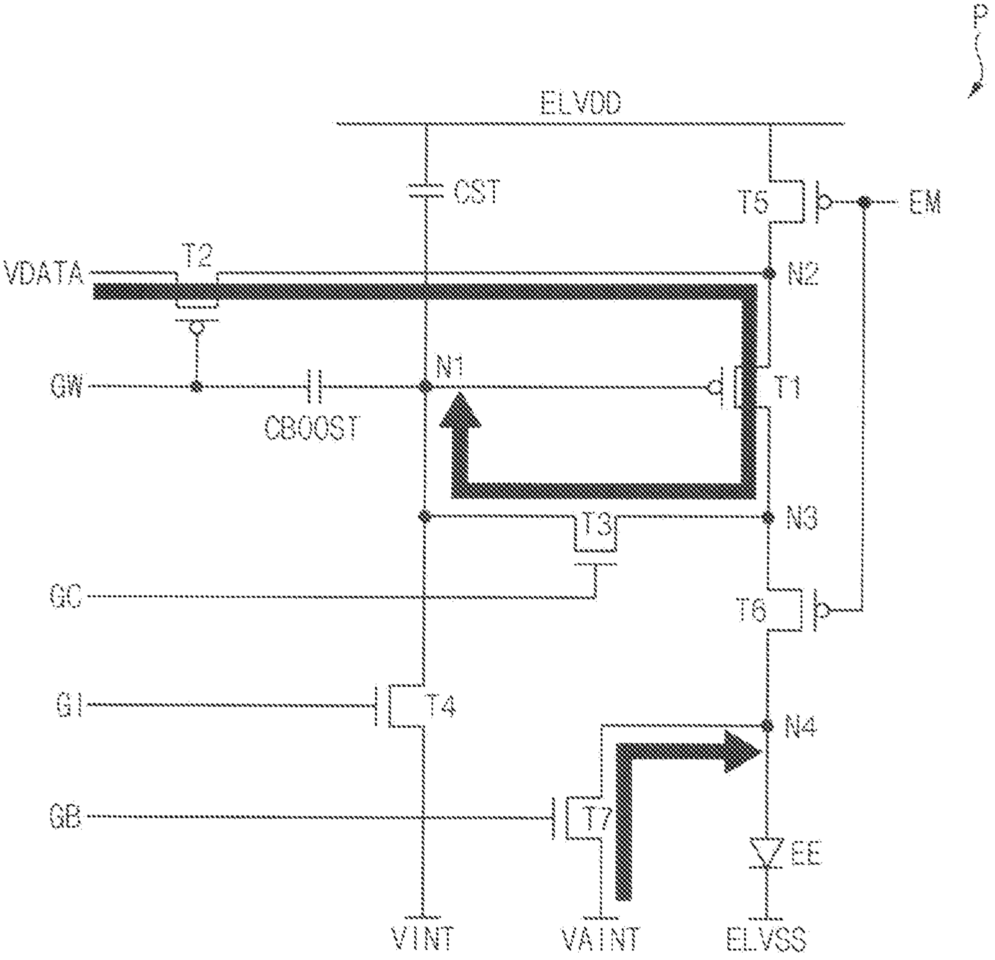
FIG. 6 is a circuit diagram illustrating an example in which the display device of FIG. 1 operates at a third time point according to embodiments of the present inventive concept.
Figure 7:
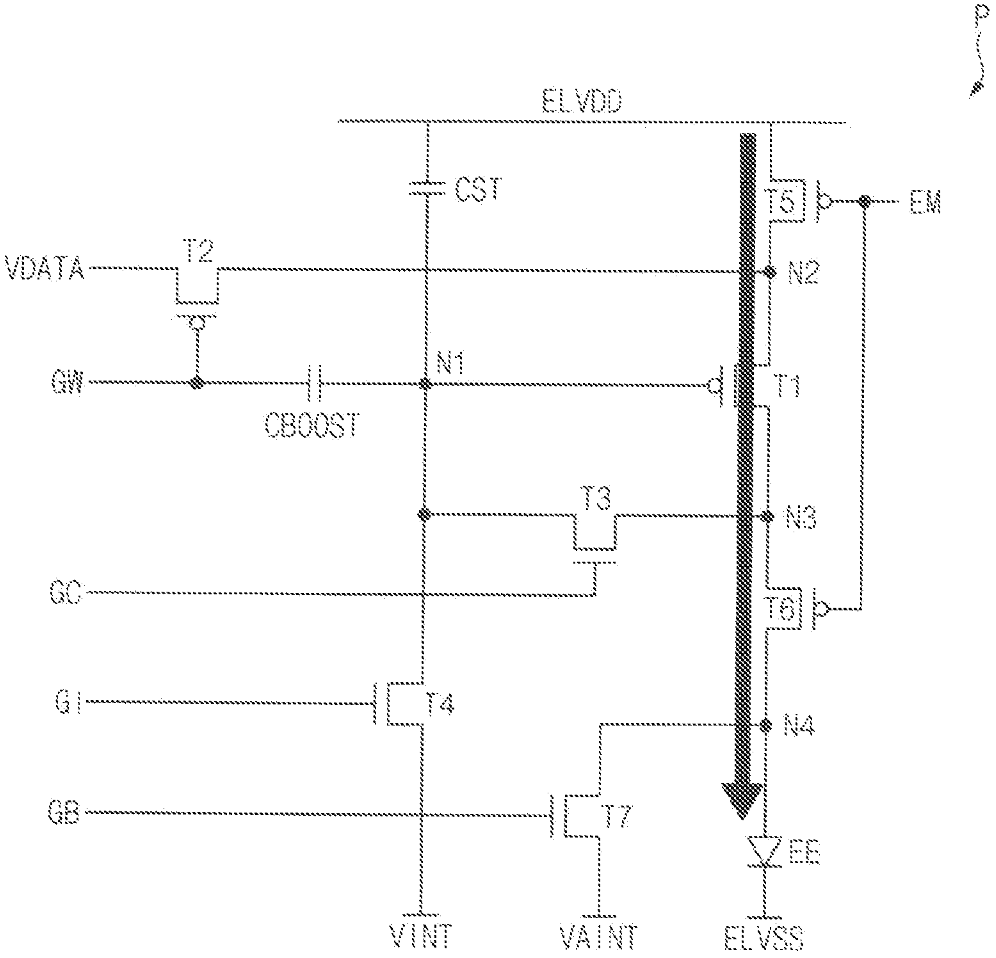
FIG. 7 is a circuit diagram illustrating an example in which the display device of FIG. 1 operates at a fourth time point according to embodiments of the present inventive concept.

FIG. 2 is a circuit diagram illustrating an example of the pixel circuits P of the display device of FIG. 1 according to embodiments of the present inventive concept. FIG. 3 is a timing diagram illustrating an example in which the display device of FIG. 1 drives the pixel circuit P according to embodiments of the present inventive concept. FIG. 4 is a circuit diagram illustrating an example in which the display device of FIG. 1 operates at a first time point t1 according to embodiments of the present inventive concept. FIG. 5 is a circuit diagram illustrating an example in which the display device of FIG. 1 operates at a second time point t2 according to embodiments of the present inventive concept. FIG. 6 is a circuit diagram illustrating an example in which the display device of FIG. 1 operates at a third time point t3 according to embodiments of the present inventive concept. FIG. 7 is a circuit diagram illustrating an example in which the display device of FIG. 1 operates at a fourth time point t4 according to embodiments of the present inventive concept.

Referring to FIGS. 2 and 3, each of the pixel circuit P may include a light emitting element EE, a write transistor T2 that writes the data voltage VDATA in response to a write gate signal GW, a driving transistor T1 that generates a driving current based on the data voltage VDATA and applies the driving current to the light emitting element EE, a compensation transistor T3 that diode-connects the driving transistor T1 in response to a compensation gate signal GC, a first initialization transistor T4 that applies a first initialization voltage VINT to a control electrode of the driving transistor T1 in response to an initialization gate signal GI, and a second initialization transistor T7 that applies a second initialization voltage VAINT to an anode electrode of the light emitting element EE in response to a bias gate signal GB having an activation period longer than at least one of the compensation gate signal GC and the initialization gate signal GI. Each of the pixel circuits P may include a first emission transistor T5 that applies a first power voltage ELVDD to the driving transistor T1 in response to an emission signal EM, and a second emission transistor T6 that transmits the driving current to the light emitting element EE in response to the emission signal EM. In an embodiment, the second initialization voltage VAINT may be smaller than the first initialization voltage VINT.

Referring to FIG. 2, each of the pixel circuits P may include a first transistor T1 (e.g., the driving transistor T1) including a control electrode connected to a first node N1, a first electrode connected to a second node N2, and a second electrode connected to a third node N3. Each of the pixel circuits P may further include a second transistor T2 (e.g., the write transistor T2) including a control electrode that receives the write gate signal GW, a first electrode that receives the data voltage VDATA, and a second electrode connected to the second node N2. Each of the pixel circuits P may further include a third transistor T3 (e.g., the compensation transistor T3) including a control electrode that receives the compensation gate signal GC, a first electrode connected to the third node N3, and a second electrode connected to the first node N1. Each of the pixel circuits P may further include a fourth transistor T4 (e.g., the first initialization transistor T4) including a control electrode that receives the initialization gate signal GI, a first electrode that receives the first initialization voltage VINT, and a second electrode connected to the first node N1. Each of the pixel circuits P may further include a fifth transistor T5 (e.g., the first emission transistor T5) including a control electrode that receives the emission signal EM, a first electrode that receives the first power voltage ELVDD (e.g., a high power voltage), and a second electrode connected to the second node N2. Each of the pixel circuits P may further include a sixth transistor T6 (e.g., the second emission transistor T6) including a control electrode that receives the emission signal EM, a first electrode connected to the third node N3, and a second electrode connected to a fourth node N4. Each of the pixel circuits P may further include a seventh transistor T7 (e.g., the second initialization transistor T7) including a control electrode that receives the bias gate signal GB, a first electrode that receives the second initialization voltage VAINT, and a second electrode connected to the fourth node N4. Each of the pixel circuits P may further include a storage capacitor CST including a first electrode that receives the first power voltage ELVDD and a second electrode connected to the first node N1. Each of the pixel circuits P may further include the light emitting element EE including a first electrode connected to the fourth node N4 and a second electrode that receives a second power voltage ELVSS (e.g., a low power voltage). In an embodiment, each of the pixel circuits P may further include a boost capacitor CBOOST including a first electrode that receives the write gate signal GW and a second electrode connected to the first node N1. However, embodiments of the present inventive concept are not limited thereto. For example, each of the pixel circuits P may have a 3T1C structure composed of 3 transistors and 1 capacitor, a 5T2C structure composed of 5 transistors and 2 capacitors, a 7T1C structure composed of 7 transistors and 1 capacitor, a 9T1C structure composed of 9 transistors and 1 capacitor. etc., according to embodiments of the present inventive concept.

In an embodiment, the driving transistor T1 may further include a lower electrode. For example, the lower electrode of the driving transistor T1 may be connected to the first electrode of the driving transistor T1.

The first, second, fifth, and sixth transistors T1, T2, T5, and T6 may be implemented as p-channel metal oxide semiconductor (PMOS) transistors. In this case, a low voltage level may be an activation level, and a high voltage level may be an inactivation level. For example, when a signal applied to a control electrode of the PMOS transistor has the low voltage level, the PMOS transistor may be turned on. For example, when a signal applied to the control electrode of the PMOS transistor has the high voltage level, the PMOS transistor may be turned off.

The third, fourth, and seventh transistors T3, T4, and T7 may be implemented as n-channel metal oxide semiconductor (NMOS) transistors. In this case, the low voltage level may be a inactivation level, and the high voltage level may be an activation level. For example, when a signal applied to a control electrode of the NMOS transistor has the low voltage level, the NMOS transistor may be turned off. For example, when a signal applied to the control electrode of the NMOS transistor has the high voltage level, the NMOS transistor may be turned on.

However, embodiments of the present inventive concept are not limited thereto. For example, the first, second, fifth, and sixth transistors T1, T2, T5, and T6 may be NMOS transistors according to embodiments. For example, the third, fourth, seventh transistors T3, T4, and T7 may be PMOS transistors according to embodiments.

Referring to FIGS. 2 and 3, the bias gate signal GB may have an activation period in an inactivation period of the emission signal EM. The initialization gate signal GI, the compensation gate signal GC, and the write gate signal GW may have the activation period in the activation period of the bias gate signal GB. The activation period may be a period in which a signal has an activation level, and an inactivation period may be a period in which a signal has an inactivation level.

In an embodiment, the bias gate signal GB may have the activation period after about 2 s or more passes from when the emission signal EM is inactivated. Accordingly, after the second emission transistor T6 is turned off, the second initialization voltage VAINT may be applied to the anode electrode of the light emitting element EE.

In an embodiment, the activation period of the bias gate signal GB may be longer than or equal to about 480 s. For example, the activation period of the bias gate signal GB may be longer than or equal to about 187 horizontal time 187H.

For example, the time that an afterimage remains may be calculated from The following equation:

$$Y=-0.0098*X+14.692$$

where, Y is a time (e.g., in units of sec) for which the afterimage remains, and X may be a time (e.g., in units of μs) for which the second initialization voltage VAINT is applied to the anode electrode. Accordingly, since the activation period of the bias gate signal GB is longer than or equal to about 480 μs, the remaining time of the afterimage may be less than about 10 sec.

Referring to FIGS. 3 and 4, for example, at the first time point t1, the bias gate signal GB may have the activation level, and the seventh transistor T7 may be turned on. Accordingly, the second initialization voltage VAINT may be applied to the first electrode (e.g., the anode electrode) of the light emitting element EE (e.g., an anode initialization operation).

Referring to FIGS. 3 and 5, for example, at the second time point t2, the initialization gate signal GI may have the activation level, and the fourth transistor T4 may be turned on. Accordingly, the first initialization voltage VINT may be applied to the first node N1 (e.g., a gate initialization operation). That is, the control electrode of the driving transistor T1 (e.g., the data voltage VDATA written to the storage capacitor CST) may be initialized. Also, the bias gate signal GB may have the activation level, and the seventh transistor T7 may be turned on. Accordingly, the second initialization voltage VAINT may be applied to the first electrode (e.g., the anode electrode) of the light emitting element EE (e.g., the anode initialization operation).

Referring to FIGS. 3 and 6, for example, at the third time point t3, the write gate signal GW and the compensation gate signal GC have the activation levels, and the second transistor T2 and the third transistor T3 may be turned on. Accordingly, the data voltage VDATA may be written to the storage capacitor CST (e.g., a data write operation). Also, the bias gate signal GB may have the activation level, and the seventh transistor T7 may be turned on. Accordingly, the second initialization voltage VAINT may be applied to the first electrode (e.g., the anode electrode) of the light emitting element EE (e.g., the anode initialization operation).

Referring to FIGS. 3 and 7, for example, at the fourth time point t4, the emission signal EM may have the activation level, and the fifth transistor T5 and the sixth transistor T6 may be turned on. Accordingly, the first power voltage ELVDD may be applied to the driving transistor T1 to generate the driving current, and the driving current may be applied to the light emitting element EE (e.g., a light emitting operation). That is, the light emitting element EE may emit light with a luminance corresponding to the driving current.

In this way, the display device may reduce the time that the afterimage remains by making an anode initialization time during which the anode initialization operation is performed longer.

Figure 8:
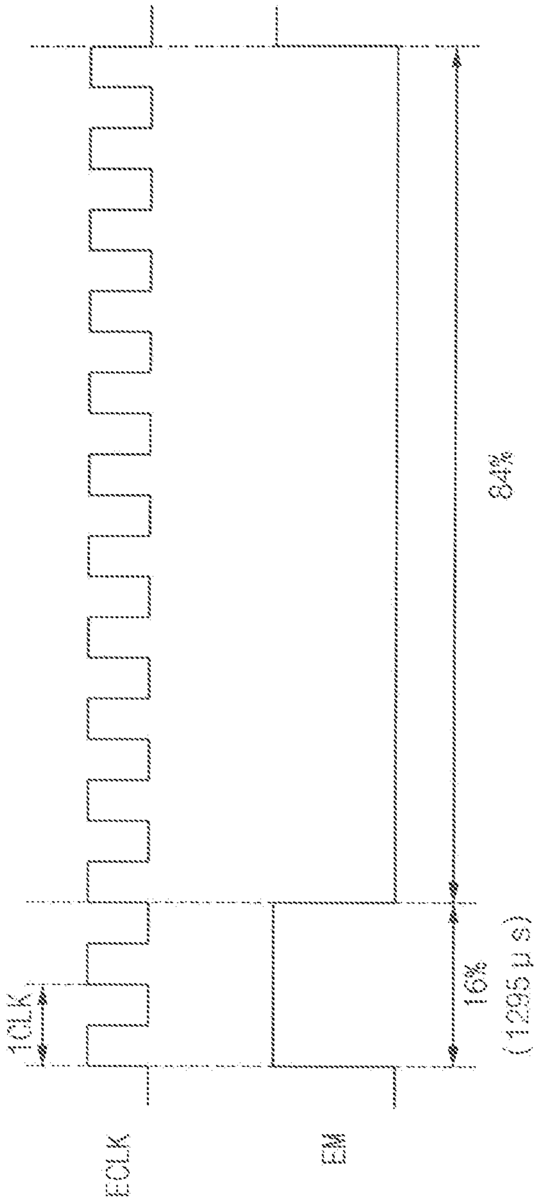
FIG. 8 is a timing diagram illustrating an emission signal of the display device of FIG. 1 according to embodiments of the present inventive concept.

FIG. 8 is a timing diagram illustrating the emission signal EM of the display device of FIG. 1 according to embodiments of the present inventive concept.

Referring to FIGS. 3 and 8, the emission signal EM may be generated based on an emission clock signal ECLK, and the emission signal EM may have the activation period of N clock times of the emission clock signal ECLK, where N is a positive integer greater than 2. For example, one cycle of the emission clock signal ECLK may be one clock time 1CLK.

The emission driver 500 may receive the emission clock signal ECLK from the timing controller 200 and generate the emission signal EM based on the emission clock signal ECLK.

For example, as shown in FIG. 8, the emission signal EM may have the activation period of two clock signals, and an off duty ratio of the emission signal EM may be about 16%. For example, when the off-duty ratio is about 16%, the inactivation period of the emission signal EM may be about 1295 μs.

The bias gate signal GB may have the activation period in the inactivation period of the emission signal EM. The activation period of the bias gate signal GB may be shorter than the N clock time of the emission clock signal ECLK.

For example, the activation period of the bias gate signal GB may be shorter than about 1290 μs. In addition, the activation period of the bias gate signal GB may have a difference of about 2 μs or more from the inactivation period of the emission signal EM.

Accordingly, since the activation period of the bias gate signal GB is shorter than the inactivation period of the emission signal EM, the bias gate signal GB may have the activation period in the inactivation period of the emission signal EM.

Figure 9:
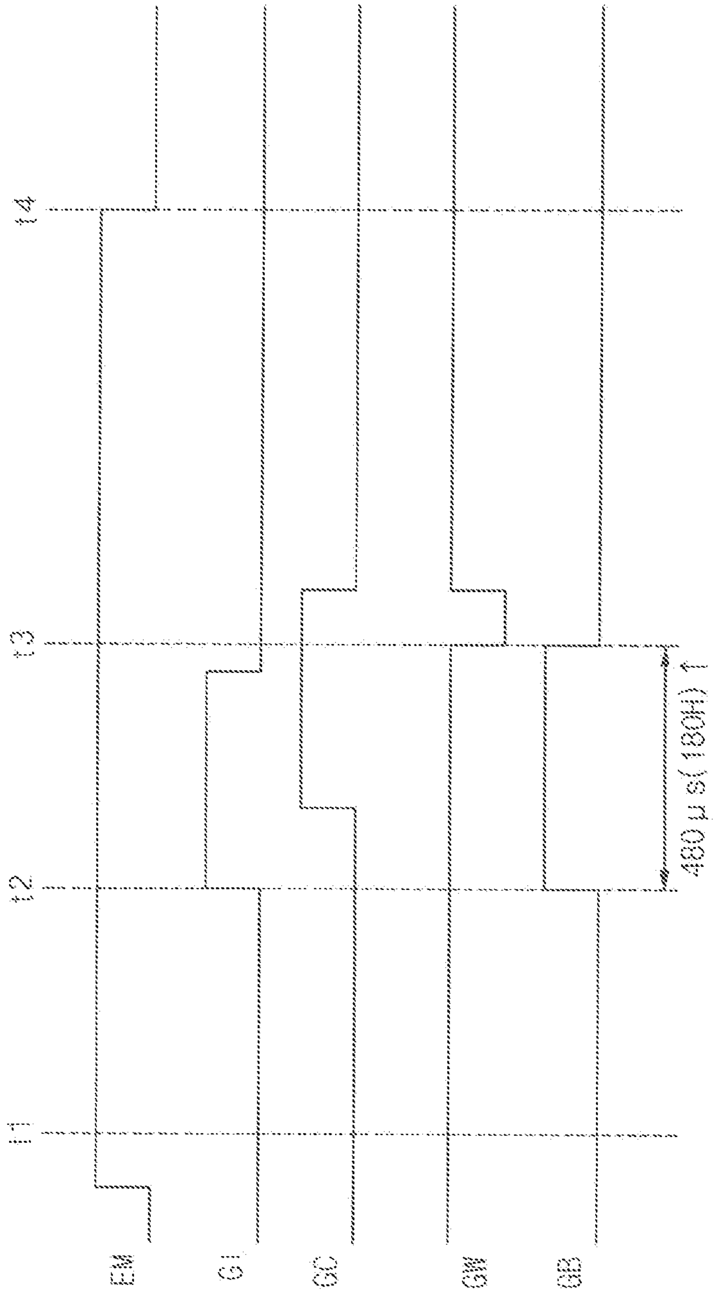
FIG. 9 is a timing diagram illustrating an example in which a display device according to embodiments of the present inventive concept drives a pixel circuit.
Figure 10:
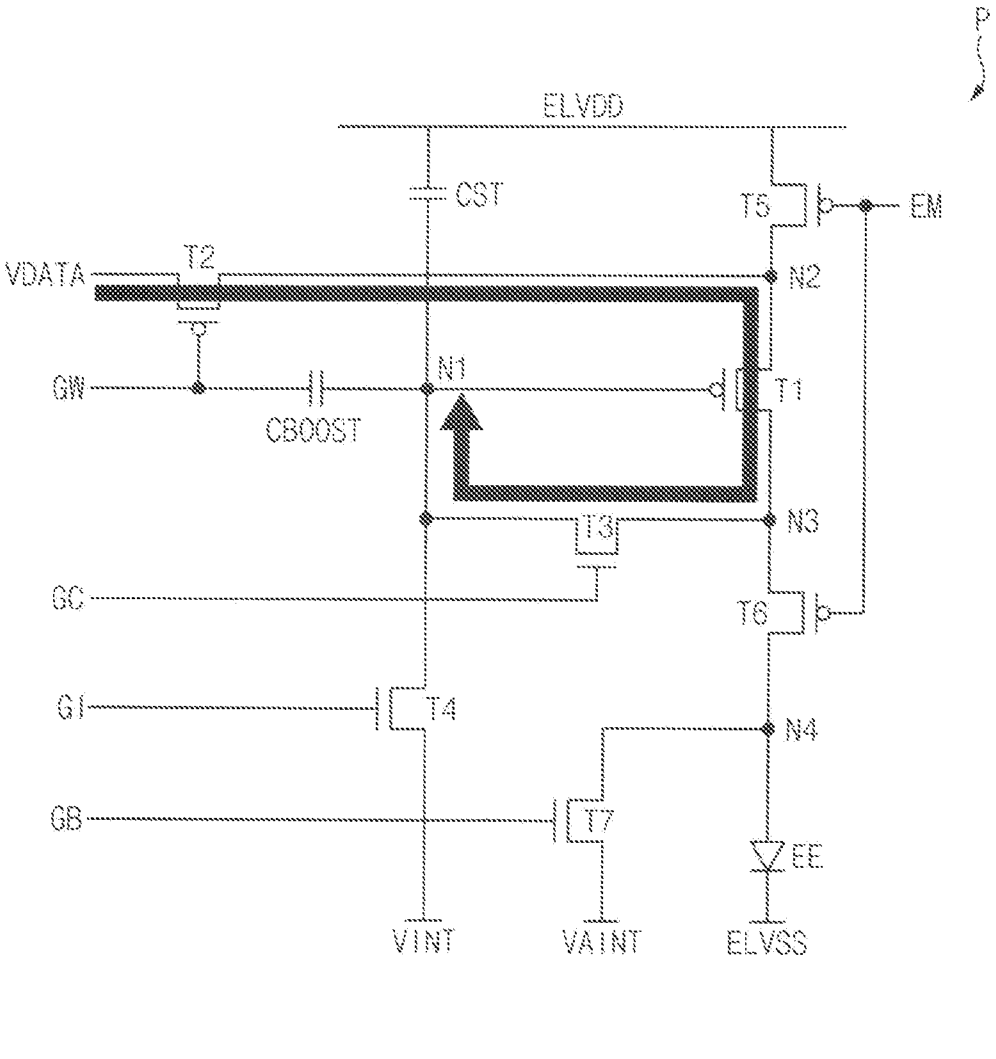
FIG. 10 is a circuit diagram illustrating an example in which the display device of FIG. 9 operates at a third time point according to embodiments of the present inventive concept.

FIG. 9 is a timing diagram illustrating an example in which a display device according to embodiments of the present inventive concept drives the pixel circuit P. FIG. 10 is a circuit diagram illustrating an example in which the display device of FIG. 9 operates at the third time point t3 according to embodiments of the present inventive concept.

The display device according to an embodiment of the present inventive concept is substantially the same as the display device of FIG. 1 except for the bias gate signal GB. Thus, for convenience of explanation, the same reference numerals are used to refer to the same or similar elements, and any repetitive explanation will be omitted.

Referring to FIGS. 9 and 10, the initialization gate signal GI may have the activation period in the activation period of the bias gate signal GB, the write gate signal GW may have the activation period in the inactivation period of the bias gate signal GB, and the compensation gate signal GC may be activated in the activation period of the bias gate signal GB and may be inactivated in the inactivation period of the bias gate signal GB.

For example, the second time point t2 and the fourth time point t4 of the display device of FIG. 9 may be substantially the same as those of the display device of FIG. 1.

For example, at a first time point t1, the bias gate signal GB may have the inactive level, and the seventh transistor T7 may be turned off. Accordingly, in embodiments, the second initialization voltage VAINT is not applied to the first electrode (e.g., the anode electrode) of the light emitting element EE.

Referring to FIGS. 9 and 10, for example, at the third time point t3, the write gate signal GW and the compensation gate signal GC have the activation level, and the second transistor T2 and the third transistor T3 may be turned on. Accordingly, the data voltage VDATA may be written to the storage capacitor CST (e.g., the data write operation). However, the bias gate signal GB may have the inactivation level, and the seventh transistor T7 may be turned off. Accordingly, in embodiments, the second initialization voltage VAINT is not applied to the first electrode (e.g., the anode electrode) of the light emitting element EE.

Figure 11:
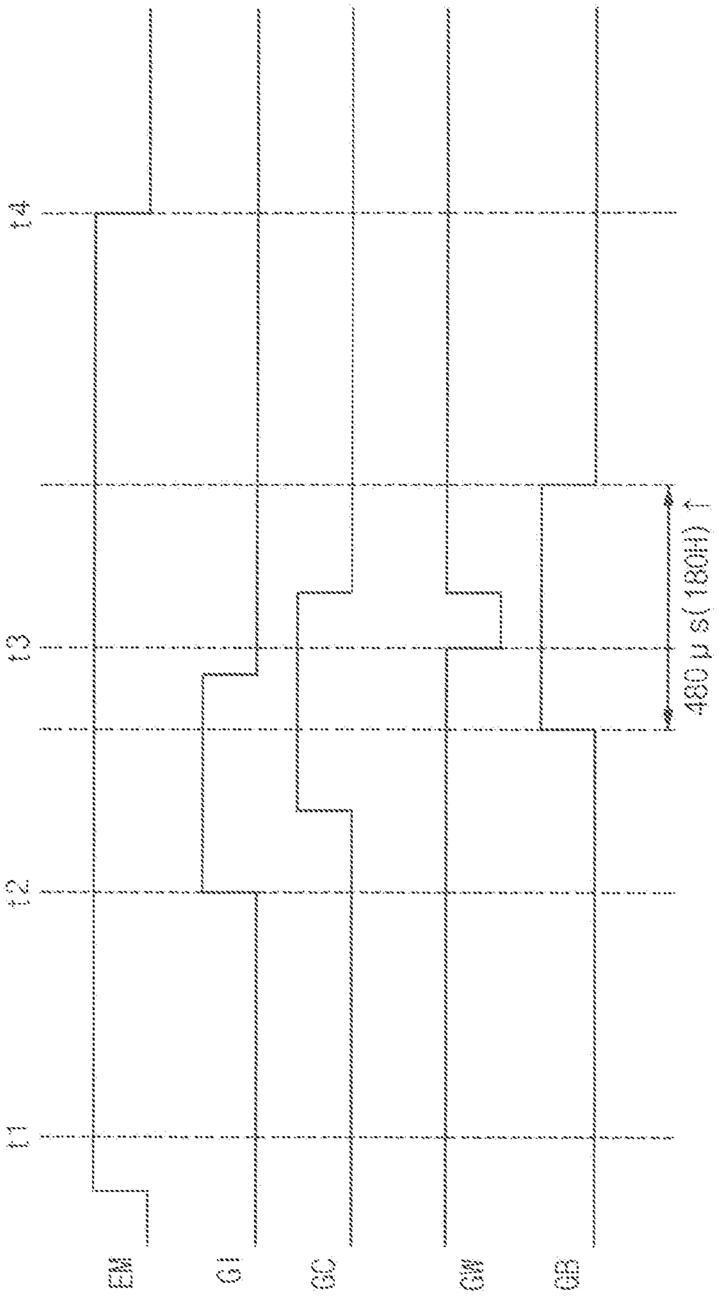
FIG. 11 is a timing diagram illustrating an example in which a display device according to embodiments of the present inventive concept drives a pixel circuit.
Figure 12:
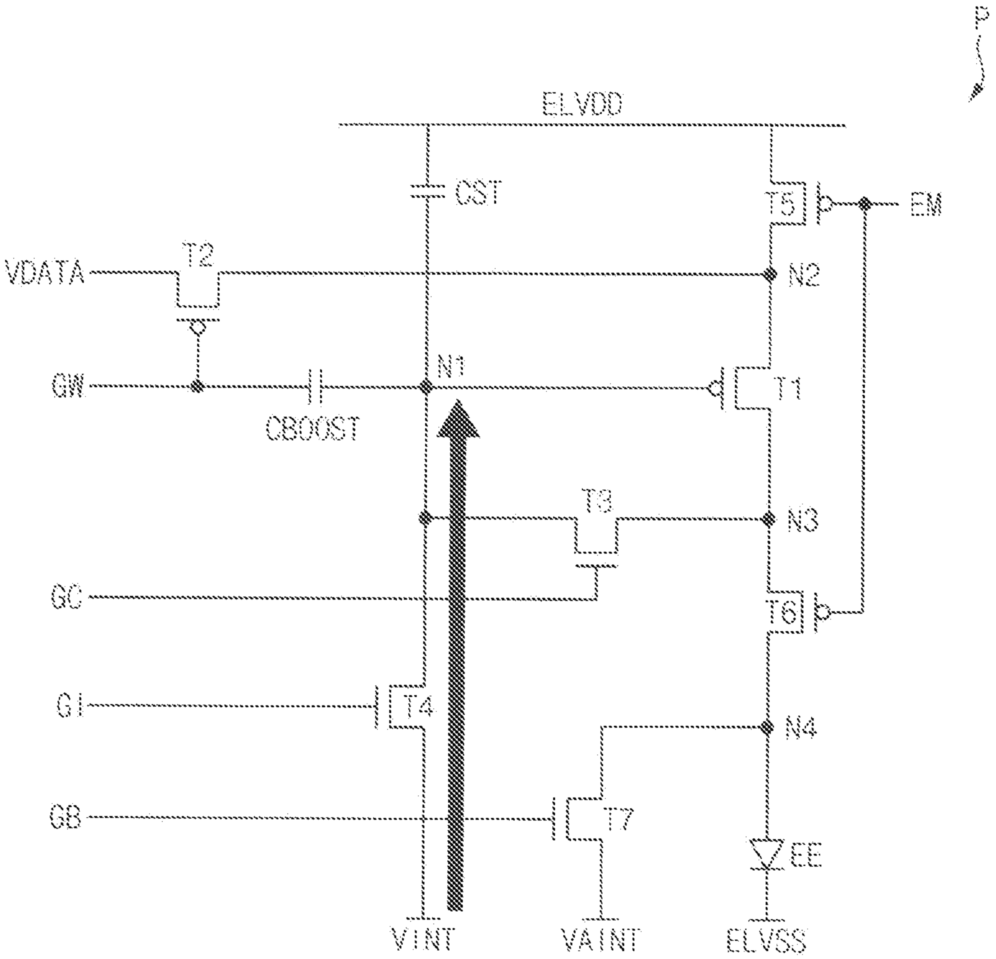
FIG. 12 is a circuit diagram illustrating an example in which the display device of FIG. 11 operates at a second time point according to embodiments of the present inventive concept.

FIG. 11 is a timing diagram illustrating an example in which a display device according to embodiments of the present inventive concept drives the pixel circuit P. FIG. 12 is a circuit diagram illustrating an example in which the display device of FIG. 11 operates at the second time point t2 according to embodiments of the present inventive concept.

The display device according to an embodiment is substantially the same as the display device of FIG. 1 except for the bias gate signal GB. Thus, for convenience of explanation, the same reference numerals are used to refer to the same or similar elements, and any repetitive explanation will be omitted.

Referring to FIGS. 11 and 12, the initialization gate signal GI and the compensation gate signal GC may be activated in the inactivation period of the bias gate signal GB, may be inactivated in the activation period of the bias gate signal GB, and the write gate signal GW may have the activation period in the activation period of the bias gate signal GB.

For example, the third time point t3 and the fourth time point t4 of the display device of FIG. 11 may be substantially the same as those of the display device of FIG. 1.

For example, at the first time point t1, the bias gate signal GB may have the inactivation level, and the seventh transistor T7 may be turned off. Accordingly, in embodiments, the second initialization voltage VAINT is not applied to the first electrode (e.g., the anode electrode) of the light emitting element EE.

Referring to FIGS. 11 and 12, for example, at the second time point t2, the initialization gate signal GI may have the activation level, and the fourth transistor T4 may be turned on. Accordingly, the first initialization voltage VINT may be applied to the first node N1 (e.g., the gate initialization operation). That is, the control electrode of the driving transistor T1 (e.g., the data voltage VDATA written to the storage capacitor CST) may be initialized. However, the bias gate signal GB may have the inactivation level, and the seventh transistor T7 may be turned off. Accordingly, in embodiments, the second initialization voltage VAINT is not applied to the first electrode (e.g., the anode electrode) of the light emitting element EE.

Figure 13:
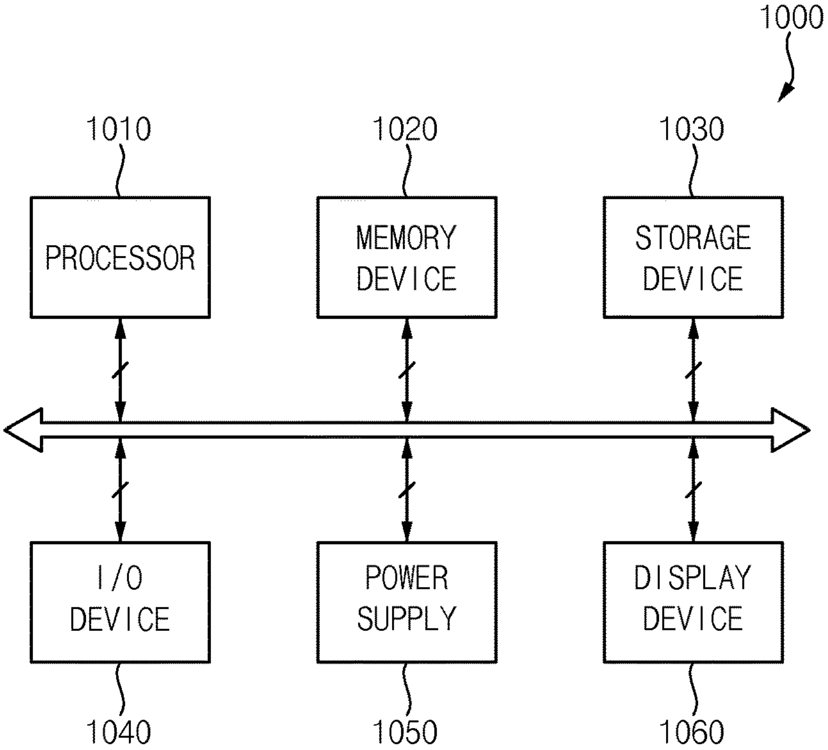
FIG. 13 is a block diagram showing an electronic device according to embodiments of the present inventive concept.
Figure 14:
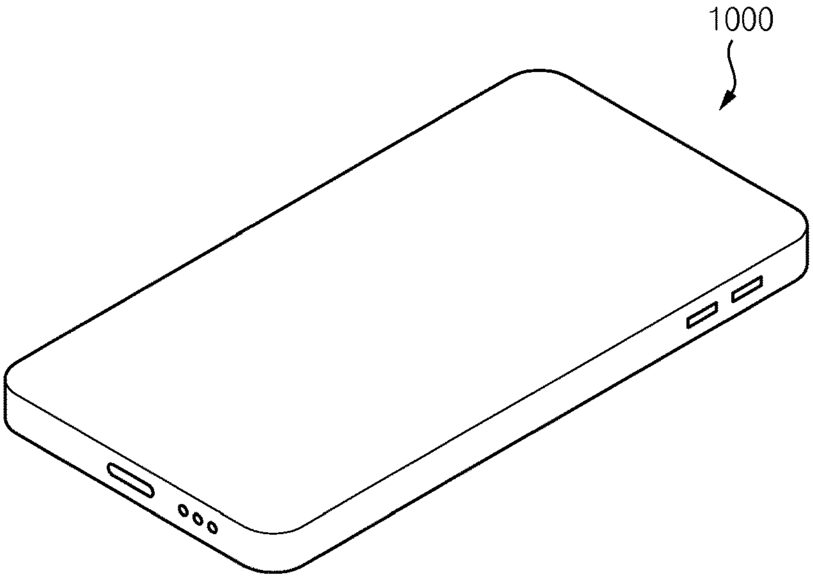
FIG. 14 is a diagram showing an example in which the electronic device of FIG. 13 is implemented as a smartphone according to embodiments of the present inventive concept.

FIG. 13 is a block diagram showing an electronic device according to embodiments of the present inventive concept. FIG. 14 is a diagram showing an example in which the electronic device of FIG. 13 is implemented as a smartphone according to embodiments of the present inventive concept.

Referring to FIGS. 13 and 14, the electronic device 1000 may include a processor 1010, a memory device 1020, a storage device 1030, an input/output (I/O) device 1040, a power supply 1050, and a display device 1060. The display device 1060 may be the display device of FIG. 1. In addition, the electronic device 1000 may further include a plurality of ports for communicating with, for example, a video card, a sound card, a memory card, a universal serial bus (USB) device, other electronic devices, etc. In an embodiment, as shown in FIG. 14, the electronic device 1000 may be implemented as a smartphone. However, the electronic device 1000 is not limited thereto. For example, the electronic device 1000 may be implemented as a cellular phone, a video phone, a smart pad, a smartwatch, a tablet PC, a car navigation system, a computer monitor, a laptop, a head mounted display (HMD) device, etc.

The processor 1010 may perform various computing functions. The processor 1010 may be, for example, a microprocessor, a central processing unit (CPU), an application processor (AP), etc. The processor 1010 may be coupled to other components via, for example, an address bus, a control bus, a data bus, etc. Further, the processor 1010 may be coupled to an extended bus such as, for example, a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as, for example, a dynamic random access memory (DRAM) device, a static random access memory (SRAM) device, a mobile DRAM device, etc.

The storage device 1030 may include, for example, a solid state drive (SSD) device, a hard disk drive (HDD) device, a CD-ROM device, etc.

The I/O device 1040 may include an input device such as, for example, a keyboard, a keypad, a mouse device, a touch pad, a touch screen, etc., and an output device such as, for example, a printer, a speaker, etc. In some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. For example, the display device 1060 may be an organic light emitting display device or a quantum dot light emitting display device, but is not limited thereto. The display device 1060 may be coupled to other components via the buses or other communication links. The display device 1060 may initialize the anode of the light emitting element for a longer period. Accordingly, the display device 1060 may reduce the afterimage. Embodiments of the present inventive concept may be applied to any electronic device including the display device. For example, embodiments of the inventive concept may be applied to a television (TV), a digital TV, a 3D TV, a mobile phone, a smartphone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

While the present inventive concept has been particularly shown and described with reference to embodiments thereof, it will be understood by those of ordinary skill in the art that various changes in form and detail may be made therein without departing from the spirit and scope of the present inventive concept as defined by the following claims.

What is claimed is:

1. A pixel circuit, comprising:

a light emitting element;

a write transistor configured to write a data voltage in response to a write gate signal;

a driving transistor configured to generate a driving current based on the data voltage and to apply the driving current to the light emitting element;

a compensation transistor configured to diode-connect the driving transistor in response to a compensation gate signal, wherein the compensation gate signal is different from the write gate signal, and an activation period of the compensation gate signal begins before an activation period of the write gate signal;

a first initialization transistor configured to apply a first initialization voltage to a control electrode of the driving transistor in response to an initialization gate signal; and a second initialization transistor configured to apply a second initialization voltage to an anode electrode of the light emitting element in response to a bias gate signal having an activation period longer than at least one of the activation period of the the compensation gate signal and an activation period of the initialization gate signal, wherein a portio nof the activation period of the compensation gate signal overlaps a portion of the activation period of the initialization gate signal, and the activation period of the bias gate signal is longer than the overlapping portions.

2. The pixel circuit of claim 1, wherein the activation period of the bias gate signal is greater than or equal to about 480 microseconds.

3. The pixel circuit of claim 1, further comprising:

a first emission transistor configured to apply a first power voltage to the driving transistor in response to an emission signal; and a second emission transistor configured to transmit the driving current to the light emitting element in response to the emission signal.

4. The pixel circuit of claim 3, wherein the bias gate signal has the activation period in an inactivation period of the emission signal.

5. The pixel circuit of claim 4, wherein the bias gate signal has the activation period after about 2 microseconds or more passes from when the emission signal is inactivated.

6. The pixel circuit of claim 3, wherein the emission signal is generated based on an emission clock signal, and wherein the emission signal has an activation period of N clock times of the emission clock signal, where N is a positive integer greater than 2.

7. The pixel circuit of claim 6, wherein the activation period of the bias gate signal is shorter than the N clock times of the emission clock signal.

8. The pixel circuit of claim 1, wherein the activation period of each of the initialization gate signal, the compensation gate signal, and the write gate signal is within the activation period of the bias gate signal.

9. The pixel circuit of claim 1, wherein the activation period of the initialization gate signal is within the activation period of the bias gate signal, wherein the activation period of the write gate signal is within an inactivation period of the bias gate signal, and wherein the compensation gate signal is activated in the activation period of the bias gate signal and is inactivated in the inactivation period of the bias gate signal.

10. The pixel circuit of claim 1, wherein the initialization gate signal and the compensation gate signal are activated in an inactivation period of the bias gate signal, and are inactivated in the activation period of the bias gate signal, and wherein the activation period of the write gate signal is within the activation period of the bias gate signal.

11. A display device, comprising:

a display panel comprising a plurality of pixel circuits;

a data driver configured to provide a data voltage to each of the pixel circuits;

a gate driver configured to provide a write gate signal, a compensation gate signal, an initialization gate signal, and a bias gate signal to each of the pixel circuits; and a timing controller configured to control the data driver and the gate driver, wherein each of the pixel circuits comprises:

a light emitting element;

a write transistor configured to write the data voltage in response to the write gate signal;

a driving transistor configured to generate a driving current based on the data voltage and to apply the driving current to the light emitting element;

a compensation transistor configured to diode-connect the driving transistor in response to the compensation gate signal, wherein the compensation gate signal is different from the write gate signal, and an activation period of the compensation gate signal begins before an activation period of the write gate signal;

a first initialization transistor configured to apply a first initialization voltage to a control electrode of the driving transistor in response to the initialization gate signal; and a second initialization transistor configured to apply a second initialization voltage to an anode electrode of the light emitting element in response to the bias gate signal having an activation period longer than at least one of the activation period of the compensation gate signal and an activation period of the initialization gate signal, wherein a portion of the activation period of the compensation gate signal overlaps a portion of the activation period of the initialization gate signal, and the activation period of the bias gate signal is longer than the overlapping portions.

12. The display device of claim 11, wherein the activation period of the bias gate signal is greater than or equal to about 480 microseconds.

13. The display device of claim 11, further comprising:

an emission driver configured to provide an emission signal to each of the pixel circuits, wherein each of the pixel circuits further comprises:

a first emission transistor configured to apply a first power voltage to the driving transistor in response to the emission signal; and a second emission transistor configured to transmit the driving current to the light emitting element in response to the emission signal.

14. The display device of claim 13, wherein the bias gate signal has the activation period in an inactivation period of the emission signal.

15. The display device of claim 14, wherein the bias gate signal has the activation period after about 2 microseconds or more passes from when the emission signal is inactivated.

16. The display device of claim 13, wherein the emission signal is generated based on an emission clock signal, and wherein the emission signal has an activation period of N clock times of the emission clock signal, where N is a positive integer greater than 2.

17. The display device of claim 16, wherein the activation period of the bias gate signal is shorter than the N clock times of the emission clock signal.

18. The display device of claim 11, wherein the activation period of each of the initialization gate signal, the compensation gate signal, and the write gate signal is within the activation period of the bias gate signal.

19. The display device of claim 11, wherein the activation period of the initialization gate signal is within the activation period of the bias gate signal, wherein the activation period of the write gate signal is within an inactivation period of the bias gate signal, and wherein the compensation gate signal is activated in the activation period of the bias gate signal and is inactivated in the inactivation period of the bias gate signal.

20. The display device of claim 11, wherein the initialization gate signal and the compensation gate signal are activated in an inactivation period of the bias gate signal, and are inactivated in the activation period of the bias gate signal, and wherein the activation period of the write gate signal is within the activation period of the bias gate signal.

* * * * *